UNITED STATES PATENT OFFICE.

CARL HAGEMANN, OF LEVERKUSEN, NEAR COLOGNE, GERMANY, ASSIGNOR TO SYNTHETIC PATENTS CO., INC., OF NEW YORK, N. Y., A CORPORATION OF NEW YORK.

GRAY AZO DYES.

1,270,290.  Specification of Letters Patent.  Patented June 25, 1918.

No Drawing. Application filed November 27, 1914, Serial No. 874,216. Renewed April 16, 1918. Serial No. 228,978.

*To all whom it may concern:*

Be it known that I, CARL HAGEMANN, doctor of philosophy, chemist, citizen of the German Empire, residing at Leverkusen, near Cologne, Germany, have invented new and useful Improvements in Gray Azo Dyes, of which the following is a specification.

I have found that new and valuable trisazodyes dyeing cotton in general grayish shades can be produced by combining a diazocompound with a suitable middle component which can be further diazotized after copulation, rediazotizing and coupling with the same or another such middle component, diazotizing and combining with one molecule of an aminonaphthol sulfonic acid, such as 2.8.6- or 2.5.7-aminonaphthol sulfonic acid, in a solution which is weakly acid or which contains bicarbonate. The new dyes are after being dried and pulverized in the shape of their alkali metal salts dark powders soluble in concentrated sulfuric acid generally with a reddish-gray to bluish to greenish coloration; yielding upon reduction with stannous chlorid and hydrochloric acid an aromatic aminocompound, diamins and an ortho-diaminooxynaphthalene sulfonic acid. They dye cotton from reddish-gray to greenish-gray shades fast to light.

As first components e. g. the following can be used: 2-aminonaphthalene-4.8-disulfonic acid, 1-naphthylamin-2-sulfonic acid, 2-naphthylamin-6- or 8-sulfonic acids, anilin, sulfanilic acid, anisidins, xylidins, toluidins, chloroanilins, nitranilins, chloroanilin sulfonic acids, chlorotoluidin sulfonic acids, aminosalicylic acid, naphthylamins and their sulfonic acids, and as middle components e. g. alpha-naphthylamin, 1.6- or 1.7-naphthylamin sulfonic acid, cresidin, anisidin, xylidin, aminonaphtholethers or their sulfonic acids, etc.

In order to illustrate the new process more fully the following example is given, the parts being by weight:—24.2 parts of 4.5-dichloroanilin-2-sulfonic acid are diazotized with 6.9 parts of sodium nitrite and 35 parts of hydrochloric acid. The diazocompound is then combined with 25 parts of 1-naphthylamin-6-sulfonic acid, the resulting dye is further diazotized and the diazoderivative is combined with 25 parts of 1-naphthylamin-7-sulfonic acid rediazotized and added to a solution of 26 parts of 2-amino-8-naphthol-6-sulfonic acid containing 10 parts of sodium bicarbonate ($NaHCO_3$). The dye is salted out, filtered off and dried. It is after being dried and pulverized in the shape of its alkali metal salt a dark powder soluble in concentrated sulfuric acid with a grayish coloration dyeing cotton gray shades fast to light. It yields upon reduction with stannous chlorid and hydrochloric acid 4.5-dichloroanilin-2-sulfonic acid, 1.4-naphthylenediamin sulfonic acid and 1.2-diamino-8-naphthol-6-sulfonic acid. It has in a free state most probably the formula:

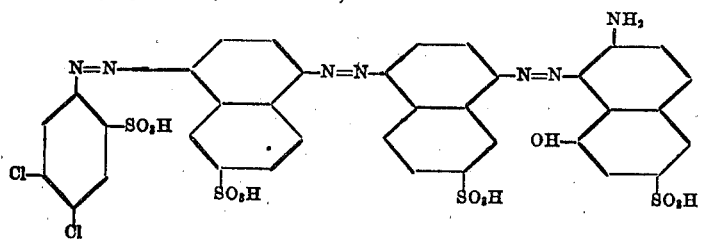

I claim:—

1. The herein described new trisazodyes which are after being dried and pulverized in the shape of their alkali metal salts dark powders soluble in concentrated sulfuric acid generally with a reddish-gray to bluish to greenish coloration; yielding upon reduction with stannous chlorid and hydrochloric acid an aromatic amino compound, diamins and an ortho-diamino-oxy-naphthalene sulfonic acid; dyeing cotton from reddish-gray to greenish-gray shades fast to light, substantially as described.

2. The herein described new trisazodyes which are after being dried and pulverized in the shape of their alkali metal salts dark powders soluble in concentrated sulfuric acid generally with a reddish-gray to bluish to greenish coloration yielding upon reduction with stannous chlorid and hydrochloric acid an aromatic amino sulfonic acid, diamins and an ortho-diamino-oxy-napththalene sulfonic acid; dyeing cotton from reddish-gray to greenish gray shades fast to light, substantially as described.

3. The herein described new trisazodyes which are after being dried and pulverized in the shape of their alkali metal salts dark powders soluble in concentrated sulfuric acid generally with a reddish-gray to bluish to greenish coloration yielding upon reduction with stannous chlorid and hydrochloric acid an aromatic amino sulfonic acid, diamins and a diamino-oxy-naphthalene sulfonic acid having the two amino-groups in the same ring; dyeing cotton from reddish-gray to greenish-gray shades fast to light, substantially as described.

4. The herein described new trisazodyes which are after being dried and pulverized in the shape of their alkali metal salts dark powders soluble in concentrated sulfuric acid generally with a reddish-gray to bluish to greenish coloration yielding upon reduction with stannous chlorid and hydrochloric acid an aromatic amino compound, diamins and a diamino-oxy-naphthalene sulfonic acid having two amino groups in the same ring; dyeing cotton from reddish-gray to greenish-gray shades fast to light, substantially as described.

5. The herein described new trisazodyes which are after being dried and pulverized in the shape of their alkali metal salts dark powders soluble in concentrated sulfuric acid generally with a reddish-gray to bluish to greenish coloration yielding upon reduction with stannous chlorid and hydrochloric acid an aromatic amino-chloro-sulfonic acid of the benzene series, diamins and a diamino-oxy-naphthalene sulfonic acid; dyeing cotton from reddish-gray to greenish-gray shades fast to light, substantially as described.

6. The herein described new trisazodyes which are after being dried and pulverized in the shape of their alkali metal salts dark powders soluble in concentrated sulfuric acid generally with a reddish-gray to bluish to greenish coloration yielding upon reduction with stannous chlorid and hydrochloric acid an aromatic amino compound, naphthylenediamin compounds and an ortho-diamino-oxy-naphthalene sulfonic acid; dyeing cotton from reddish-gray to greenish-gray shades fast to light, substantially as described.

7. The herein described new trisazodyes which are after being dried and pulverized in the shape of their alkali metal salts dark powders soluble in concentrated sulfuric acid generally with a reddish-gray to bluish to greenish coloration yielding upon reduction with stannous chlorid and hydrochloric acid an aromatic amino compound, sulfonaphthylenediamins and diamino-oxy-naphthalene sulfonic acid; dyeing cotton from reddish-gray to greenish-gray shades fast to light, substantially as described.

8. The herein described new trisazodyes which are after being dried and pulverized in the shape of their alkali metal salts dark powders soluble in concentrated sulfuric acid generally with a reddish-gray to bluish to greenish coloration yielding upon reduction with stannous chlorid and hydrochloric acid an aromatic amino compound, sulfonaphthylenediamins and a diamino-oxy-naphthalene sulfonic acid having the two amino groups in the same ring; dyeing cotton from reddish-gray to greenish-gray shades fast to light, substantially as described.

9. The herein described new trisazodyes which are after being dried and pulverized in the shape of their alkali metal salts dark powders soluble in concentrated sulfuric acid generally with a grayish coloration yielding upon reduction with stannous chlorid and hydrochloric acid an amino-chloro-benzene sulfonic acid, aromatic diamins and a diamino-oxy-naphthalene sulfonic acid; dyeing cotton from grayish shades fast to light, substantially as described.

10. The herein described new trisazodyes which are after being dried and pulverized in the shape of their alkali metal salts dark powders soluble in concentrated sulfuric acid generally with a grayish coloration yielding upon reduction with stannous chloric and hydrochloric acid an amino-chloro-benzene sulfonic acid, sulfonaphthylene diamins and a diamino-oxy-naphthalene sulfonic acid neither of the amino groups being in ortho position to the oxy-group; dyeing cotton from grayish shades fast to light, substantially as described.

11. The herein described new trisazodye having in a free state most probably the formula:

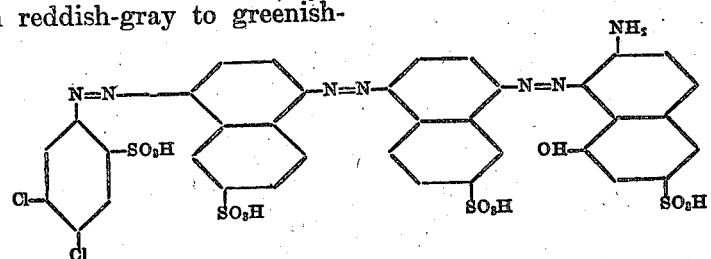

which is after being dried and pulverized in the shape of its alkali metal salt a dark powder soluble in concentrated sulfuric acid with a grayish coloration; yielding upon reduction with stannous chlorid and hydrochloric acid 4.5-dichloroanilin-2-sulfonic acid, 1.4-naphthylene-diamin sulfonic acid and 1.2-diamino-8-naphthol-6-sulfonic acid; dyeing cotton grayish shades fast to light, substantially as described.

In testimony whereof I have hereunto set my hand in the presence of two subscribing witnesses.

CARL HAGEMANN.

Witnesses:
 J. WIJNEN,
 J. C. ZIERECKEY.